B. KELLEY.
ELECTRICALLY OPERATED DUPLICATE TYPE WRITING MACHINE.
APPLICATION FILED JAN. 7, 1910.
1,078,626.
Patented Nov. 18, 1913.
4 SHEETS—SHEET 2.
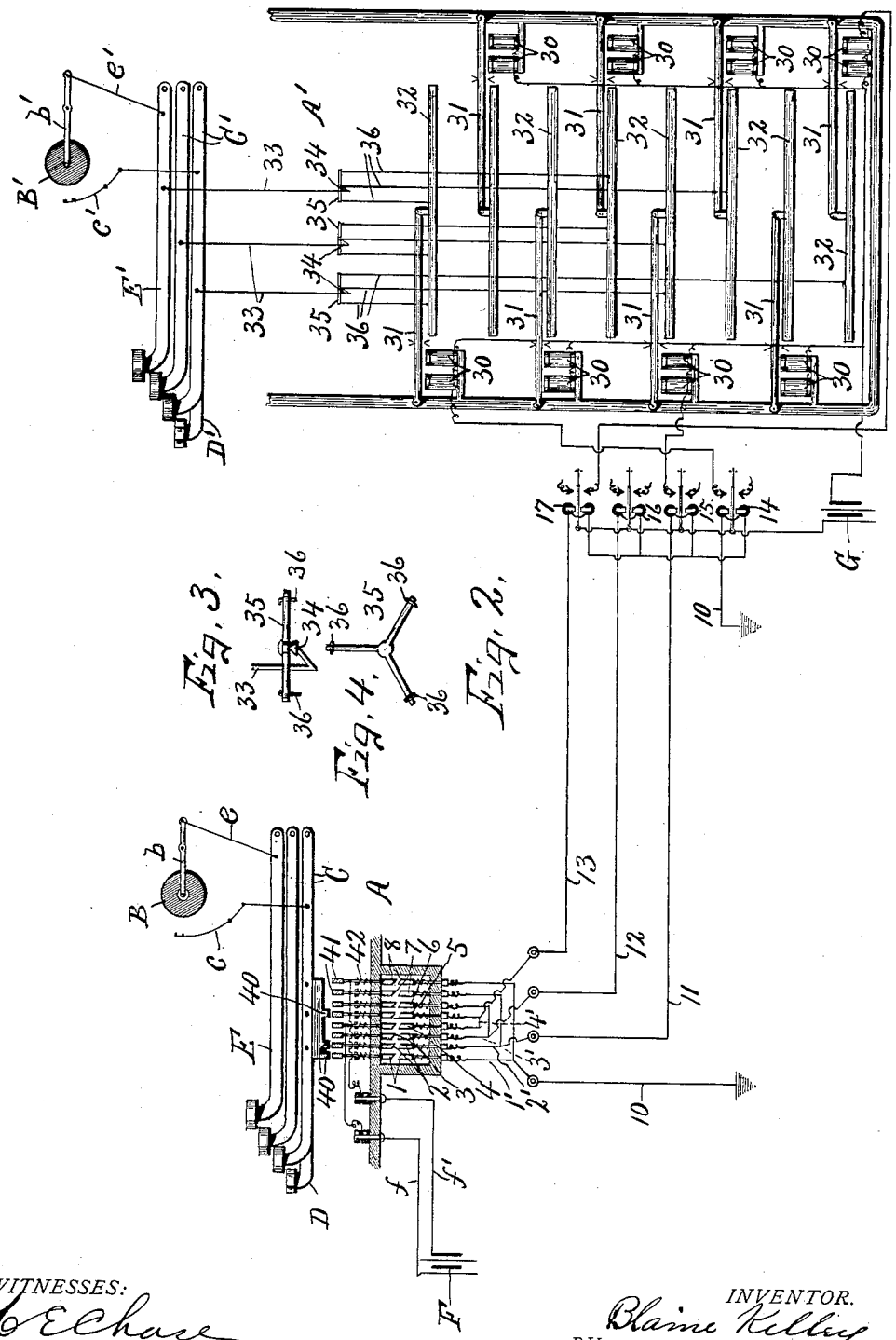

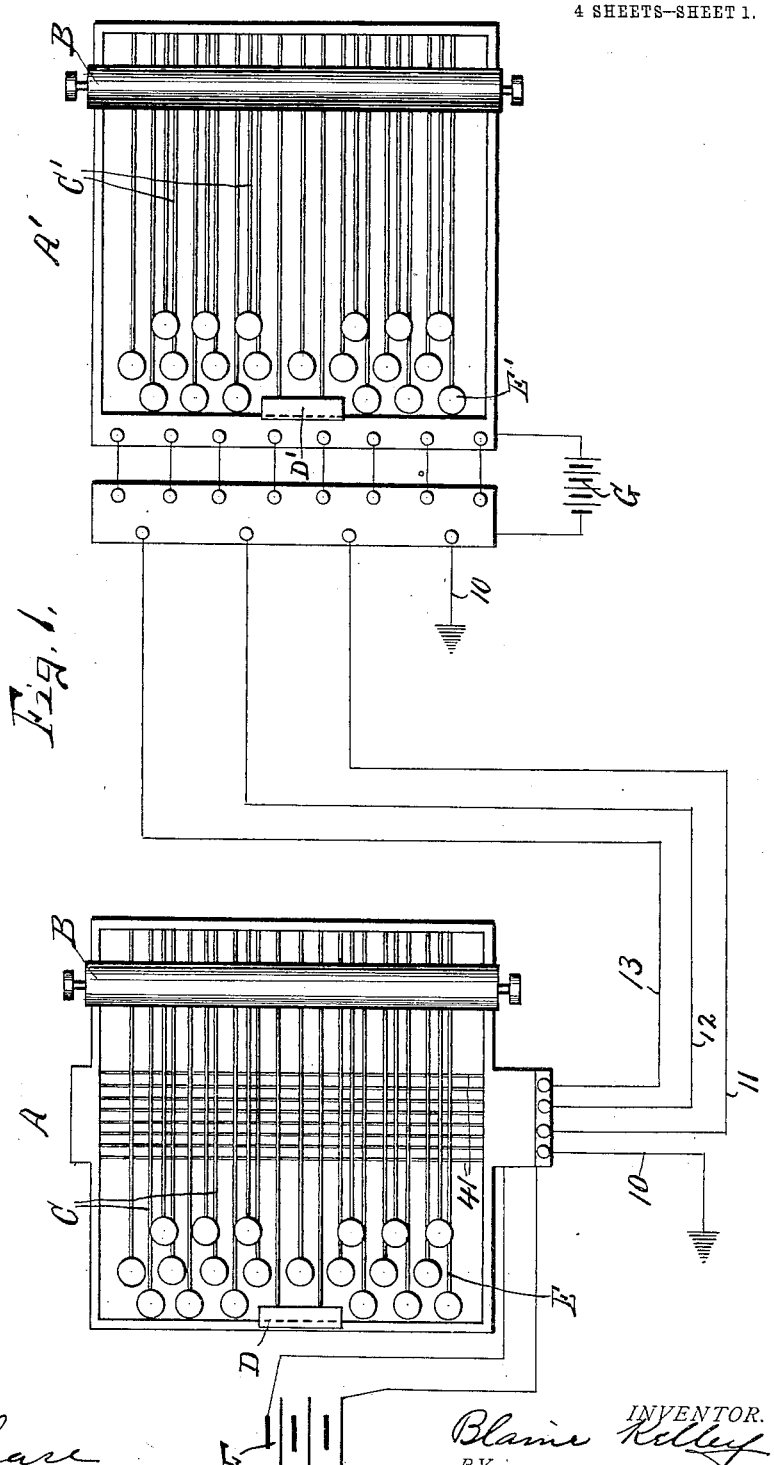

B. KELLEY.
ELECTRICALLY OPERATED DUPLICATE TYPE WRITING MACHINE.
APPLICATION FILED JAN. 7, 1910.
1,078,626.
Patented Nov. 18, 1913.
4 SHEETS—SHEET 3.
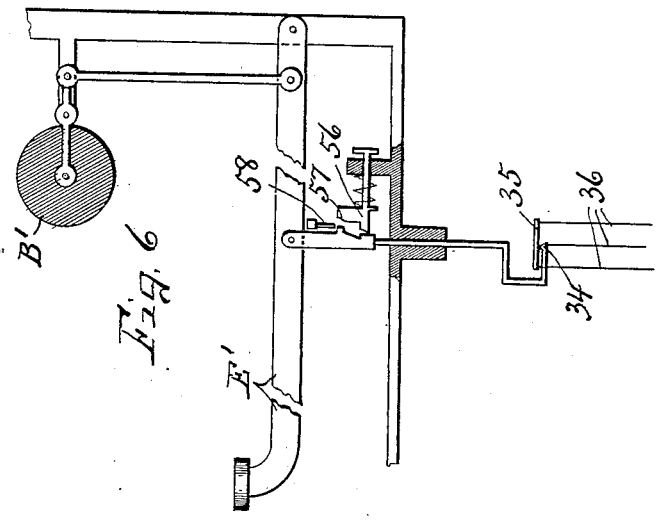
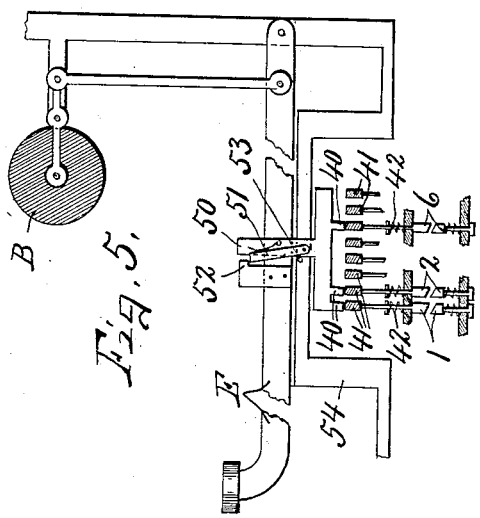

B. KELLEY.
ELECTRICALLY OPERATED DUPLICATE TYPE WRITING MACHINE.
APPLICATION FILED JAN. 7, 1910.
1,078,626.
Patented Nov. 18, 1913.
4 SHEETS—SHEET 4.
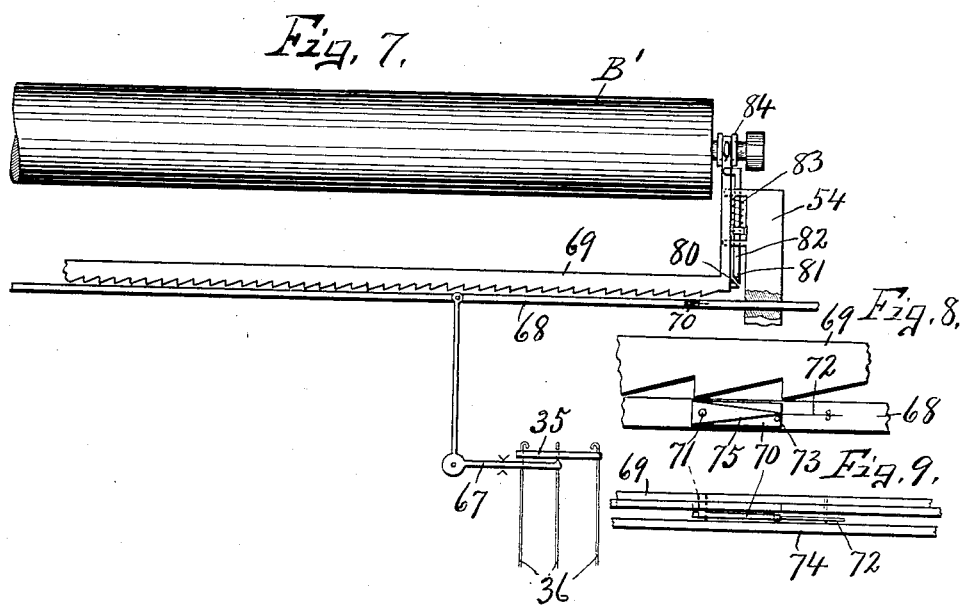
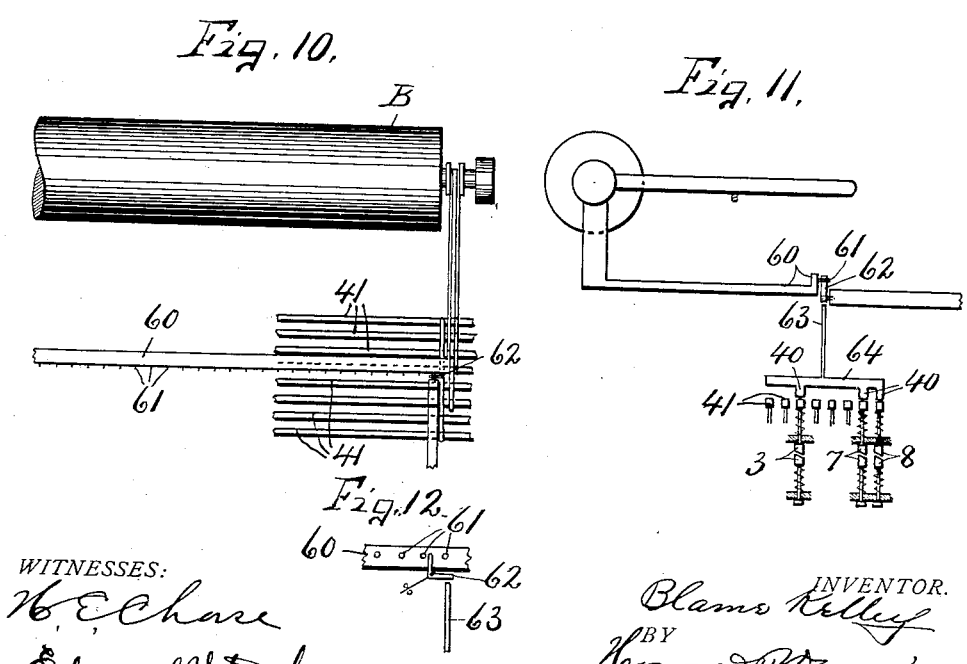
WITNESSES:
INVENTOR.
BY
ATTORNEY.

UNITED STATES PATENT OFFICE.

BLAINE KELLEY, OF SYRACUSE, NEW YORK.

ELECTRICALLY-OPERATED DUPLICATE TYPE-WRITING MACHINE.

1,078,626.  Specification of Letters Patent.  Patented Nov. 18, 1913.

Application filed January 7, 1910. Serial No. 536,902.

*To all whom it may concern:*

Be it known that I, BLAINE KELLEY, of Syracuse, in the county of Onondaga, in the State of New York, have invented new and useful Improvements in Electrically-Operated Duplicate Type-Writing Machines, of which the following, taken in connection with the accompanying drawings, is a full, clear, and exact description.

This invention relates to certain improvements in electrical distributing systems and refers more particularly to duplicate typewriting machines and suitable electrically operated selectors by which manually operated keys of one machine will cause the operation of corresponding keys of a similar machine located at any distance from the sending machine, so that the same printed matter produced by the sending machine will be duplicated by the receiving machine.

The primary object is to reproduce the typewritten matter of one machine in a similar distant machine through the medium of electrically controlled selectors over a minimum number of line wires. In other words, I have sought to electrically transmit the action of the various parts of any key board machine to the corresponding parts of a similar machine located at any suitable distance from the sending machine over a comparatively small number of line conductors.

Other objects and uses relating to specific parts of the duplicate printing apparatus will be brought out in the following description.

Figure 1 is a top plan of the key-boards and platens of the sending and receiving typewriting machines showing diagrammatically the connecting line-conductors and sources of electric energy and also showing the universal bars for the circuit closers at the sending machine and the housing for the relays at the receiving machine. Fig. 2 is an elevation partly in section of portions of the key-boards, platen and type bars of both machines showing diagrammatically the electrical means for transmitting motion from certain parts of the sending machine to corresponding parts of the receiving machine. Fig. 3 is an enlarged elevation of one of the tilting actuating members for the keys of the receiving machine and the fulcrum therefor. Fig. 4 is a top plan of the same actuator. Figs. 5 and 6 are elevations partly in section of the platen shifting mechanisms of the two machines showing the means actuated by the shift-key at the sending station for transmitting motion to the shift-key of the receiving station. Fig. 7 is a front elevation of the carriage return and line spacing mechanism for the receiving machine. Figs. 8 and 9 are respectively enlarged face views and top plan of a portion of the toothed rack and pawl for returning the carriage shown in Fig. 7. Fig. 10 is a top plan of a portion of the carriage return mechanism of the sending machine. Fig. 11 is an end view of the mechanism seen in Fig. 10. Fig. 12 is a detail face view of a portion of the toothed rack shown in Fig. 10.

In setting forth the advantages of my invention, I have shown portions of two similar typewriting machines —A— and —A'— of the single key-board type, stationed any distance apart, the machine —A— being hereinafter designated as the sending machine, while the machine —A'— will be defined as the receiving machine. Each of these machines is provided with the usual platen —B— and —B'—, type-bar actuating keys —C— and —C'—, letter spacing keys —D— and —D'— and shift keys —E— and —E'— together with suitable means for effecting the rotation of the platen for line spacing and additional mechanism brought into action by the manual return of the platen carriage at the sending station for effecting a similar return of the platen carriage at the receiving station.

A source of electric energy, as a storage battery —F—, is electrically connected by wires —f— and —f'— to one set of terminals of a series of, in this instance eight, normally open circuit closers 1, 2, 3, 4, 5, 6, 7 and 8 which are subdivided into sets of four each, those of one set at one side being electrically connected to the positive pole, while those of the other set of the same side are electrically connected to the negative pole of the battery.

The opposite terminals of the circuit closers are electrically connected in pairs, one positive to one negative, by loop-wires 1', 2', 3' and 4', that is the positive terminals of the circuit closers 1, 2, 3 and 4 are connected respectively to the negative terminals 8, 7, 6 and 5 for a purpose hereinafter described.

The loop-wires 1', 2', 3' and 4' are electrically connected by line-conductors 10, 11, 12 and 13 to a corresponding number of polarized relays 14, 15, 16 and 17 at the receiving station, one of the conductors, as —10—, being grounded at each station, the armature of each relay being normally held between and out of contact with a coacting pair of terminals each connected to a separate local magnet circuit.

One terminal of each relay-magnet is connected to one of the line-wires, while the opposite terminals of such relay-magnets are electrically connected to each other, and each relay-magnet is electrically connected in series with each of the other relay-magnets and is also electrically connected by the line-wires 10, 11, 12 and 13 to the positive and negative terminals of the circuit closers, so that as the latter are operated in different combinations each including at least one positive and one negative terminal, the direction of current through the relay-magnets and consequently the movement of their corresponding armatures may be reversed for closing one or the other of two local circuits for each relay at the receiving station. Each relay therefore controls two local circuits and in each circuit is connected a suitable translating device as an electro-magnet —30— having an armature —31— to which is secured a key operating bar or plate —32— for the keys at the receiving station.

Attached to each of the keys of the receiving station is a pendent supporting rod or link —33— terminating in a pointed rest or fulcrum —34— upon which is centrally supported or fulcrumed a tiltable lever, disk or key operating member —35—.

Connected to each disk or key operating member are a series of, in this instance three, pendent rods or links —36— which are arranged equi-distant apart around the fulcrum —34— or tilting axis of the disk, each one of said rods —36— being connected to a different one of the bars —32— although one of the rods —36— of a plurality of separate disks —35— may be connected to the same bar —32— as is clearly shown in Fig. 2.

It is now evident that when a particular key at the sending station is operated in order to produce a similar action of the corresponding key at the receiving station some means must be provided whereby the operated key at the sending station will cause the bodily movement of the operating disk for the corresponding key at the receiving station. One method of accomplishing this result is to provide each key at the sending station with a series of, in this instance three, actuating fingers —40— so arranged that when the key is depressed they will engage and operate certain predetermined combinations of universal bars —41— which extend transversely under the entire bank of key-levers, one for each of the circuit closers, thereby bringing the terminals of the corresponding circuit-closers into contact for closing the circuits through the relays which may be electrically connected to those particular terminals.

The movable contact terminals of the circuit-closers preferably consist of plungers provided with a retracting spring —42— for holding that particular terminal out of contact with its coacting terminal and, as previously stated, four of the terminals are electrically connected to the positive pole of the battery —F— while the other four are connected to the negative pole.

The universal bars —41— which correspond in number to that of the circuit-closers are movable vertically and serve as means for transmitting motion from the operating fingers —40— to the movable contacts.

Each of the key-levers —C— is provided with a series of, in this instance three, operating fingers —40— combined and arranged so as to operate either two positive and one negative or two negative and one positive terminals, each combination of fingers being arranged to operate a different set or combination of circuit-closers than the others.

In the use of the particular number of circuit-closers, polarized relays and line-conductors, previously described, I am enabled to operate a much larger number, in this instance twenty-two or more keys, at the receiving station by the operation of the corresponding keys at the sending station.

In Fig. 2 is shown a type-bar —c— as connected to one of the type-bars —C— of the sending station, a similar type-bar —c'— being also shown as connected to the corresponding key-lever —C'— at the receiving station. The platens —B— and —B'— are mounted upon rocking supports —b— and —b'— which are connected by links —e— and —e'— respectively to the shift levers —E— and —E'—.

In illustrating the operation of my invention, in Fig. 2 I have shown fingers —40— on one of the key-levers —C— as arranged to operate the circuit-closers 1, 2 and 5 as such key lever is depressed thereby closing the circuit through the relays 14, 15 and 17, the current passing from the positive terminals —1— and —2— through the line-conductors —10— and —11— to the same side of their respective relay magnets —14— and —15— but through the reverse side of the magnet —17— and thence through the line-conductor —13— to the circuit-closer —5— which is in electrical connection with the negative pole of the battery —F—. By thus energizing the electro-magnets 14, 15 and 17 their respective armatures are drawn into electrical contact with one of the contact terminals of the local circuit at the receiving station thereby energizing the corresponding three electro-magnets —30— and thus operating the armatures of such magnets and also the bars —32— connected thereto. As previously stated each of these bars is connected by a separate rod —36— to one of the tiltable operating members —35— which in turn is supported upon the hanger —33— from the corresponding key-lever—C'— at the receiving station and effects the operation of the last named lever. In like manner fingers may be provided upon other key-levers for closing the circuit-closers 1, 3 and 5; 1, 4 and 5; 2, 3 and 5; 2, 4 and 5; 3, 4 and 5 and so on through the several combinations to which the series of eight circuit-closers are susceptible, it being understood that in each case the polarized relays which act as selectors serve to operate a corresponding set of bars —32— which will in turn operate through the medium of one of the disks —35— the lever at the receiving station corresponding to that which is operated at the sending station.

The operation just described is particularly adapted for transmitting motion from the type-bar levers of the sending machine to the corresponding levers of the receiving machine. During this operation of the type-bar levers which is also the same for the letter-spacing levers, the platen carriages of both machines are shifted in the usual manner for letter-spacing.

*Platen shifting mechanism.*—The operation of the platen shifting mechanism is quite similar to that for the type-bar actuating mechanisms in that it makes use of a certain combination of operating fingers —40— on the shift key —E— for operating a predetermined combination of circuit-closers, in this instance, 1, 2 and 6, as shown in Fig. 5. It will be noted, however, that in the shifting mechanism shown in Figs. 5 and 6 the fingers —40— are mounted upon a separately movable plate or support —50— to which is pivoted a pawl —51— the latter being spring pressed into the path of a shoulder —52— on the shift lever —E—.

A pin —53— is secured to a portion of the main supporting frame, as —51—, so as to engage one side of the pawl —51— which latter normally overhangs said pin. Now as shift-lever —E— is depressed to shift the platen —B— the shoulder —52— engages the pawl —51— and depresses the finger supporting plate —50— sufficient to operate the circuit-closers 1, 2 and 6 whereupon the further depression of the key-lever —E— causes the pawl to ride against the pin —53— which forces said pawl out of engagement with the shoulder —52— and allows the finger-bar —50— to be returned to its normal position by the opening of said circuit-closers by their retracting springs —42—, the shift-lever being held down until the proper type-key or keys is or are operated. During this depression of the shift-key —E— at the sending station and consequent operations of the circuit-closers 1, 2 and 6 which are electrically connected to the polarized relays over the line-wires in the manner previously described for the type-bar levers, a certain predetermined combination of electro-magnets —30— at the receiving station will be energized and cause the operation of one of the disks —35— which is connected to the corresponding shift-key —E'— at the receiving station. When the key-lever —E'— is thus depressed, it is temporarily locked in its depressed position by a spring actuated locking bolt —56— having a cam face —57— which, when the bolt is in its locking position, is depressed in the path of movement of a universal releasing bar —58—. This releasing bar extends underneath the bank of keys of the receiving machine so that while the shift-key is held in its depressed position for shifting the platen —B'— and during which the circuit-closers which cause the depression of such shift-key have been restored to their normal open position, the operation of the desired key or keys at the sending station will cause a similar operation of the corresponding key at the receiving station and thereby operate the universal bar —58— against the cam face —57— to release the bolt —56— from its holding position and allow the return of the shift-lever —E'— in the usual manner, such return of the shift-lever also effecting the return of the operating member —35— and armatures connected thereto. This operation of shifting the platen at the sending and receiving stations and subsequent operation of the type-bar levers may be repeated as often as may be desired for printing upper case characters.

*Carriage return and line spacing mechanism.*—During the operation of printing the carriage is moved, step by step, in the usual manner for letter and word spacing and it becomes necessary to provide means whereby the operation of returning the carriage at the sending station will cause a similar operation of the carriage at the receiving station and will also automatically rotate both platens, step by step, at each return of the carriage for line-spacing. The means for effecting this carriage return and line spacing is shown in Figs. 7 to 12, inclusive.

Mounted upon the carriage of the sending machine, parallel with the platen, is a bar —60— having a series of pins —61— projecting laterally from one side thereof and spaced a uniform distance apart. Associated with this bar and preferably secured to some portion of the frame of the machine, see Figs. 10 and 11, is a spring retracted bell crank lever —62— having one arm projecting into the path of the pins —60— and its other arm adapted to engage a support —63— for a finger bar —64—, the latter being provided with a series of, in this instance three, fingers —40— similar to those previously described but arranged to close a different combination of circuit-closers, as for example 3, 7 and 8 which latter are connected by the line-wires to certain of the relay-magnets for closing the local circuit at the receiving station through the predetermined set of electro-magnets —30— for operating another one of the disks —35—. This particular disk which is located at the receiving station is centrally fulcrumed upon one arm of a bell crank lever —67—, the other arm of said lever being pivotally connected to a sliding bar —68— parallel with the platen —B'— and in proximity to a toothed-rack —69— which is also parallel with the platen and secured to the local carriage of the receiving machine.

A pawl —70— is pivoted at —71— to the sliding bar —68— and is movable into and out of engagement with the teeth of the rack —69— as the bar —68— is moved in opposite directions by the lever —67—. The pawl is normally held out of engagement with the teeth by a retracting spring —72— but is forced into engagement with the teeth successively by a pin —73— which is secured to a fixed portion —74— of the frame of the machine, said pawl being provided with an inclined face —75— which rides against the pin —73— to force the pawl successively into engagement with the teeth of the rack —69— as the bar —68— is moved in one direction or to the right of Figs. 7 and 8.

During the return of the carriage at the sending station by hand, the pins —61— successively engage and operate the bell crank —62— to close certain circuit closers, as 3, 7 and 8 thereby operating the corresponding relays or selectors for effecting the downward pull of the proper combination of draw rods —36— and corresponding disk —35— which in turn actuates the bell crank lever —67— and sliding bar —68— to move the carriage at the receiving station, step by step, until returned to its starting position at which time the platen is rotated one line space by a mechanism presently described.

*Line spacing mechanism.*—Secured to one end of the toothed-rack —69— is a beveled shoulder —80— which when the carriage is returned to its starting position engages a similar beveled face —81— on a sliding pawl —82—, the latter being guided in suitable ways in a portion of the frame —54—.

When the beveled faces —80— and —81— are brought together the pawl —82— is operated against the action of a retracting spring —83— into engagement with a ratchet wheel —84— on one end of the shaft of the platen —B— to rotate said platen one line space whereupon the operation of printing another line may be repeated in the manner previously described.

What I claim is:

1. In an electrical selective system, a system of transmitter keys, a relatively smaller number of circuit closers, a less number of line circuits, each connected to a plurality of circuit closers, separate selective devices actuated by said keys and each selecting and operating a different combination of circuit closers, for impressing current upon the corresponding line circuits, and separate translating devices brought into action by the closing of such circuits.

2. In an electrical selective system, a plurality of receiving devices, separate actuators therefor and each having an independent movement irrespective of its receiving device, separate electrical devices, connected to the actuators, a plurality of transmitting devices, and electrical means brought into action by the operation of any one of the transmitting devices for selecting and simultaneously energizing the combination of electrical devices which are connected to the same actuator.

3. In an electrical selective system, a transmitter key board and a duplicate receiver key board, each receiver key having a supporting member, separate tiltable actuators fulcrumed on said supports, separate electrical devices, each connected to a plurality of actuators, and electrical means brought into action by the operation of each of the transmitting keys for energizing a combination of said electrical devices which are connected to one of the actuators.

4. In an electrical selective system, a transmitter and a receiver, a tiltable actuator and fulcrum therefor connected to the receiver, separate electrical devices connected to the actuator at different points around the fulcrum whereby when all of the electrical devices are energized simultaneously the actuator will be moved bodily to actuate the receiver and when a less number than all of said devices are energized the actuator will be simply tilted on its fulcrum without operating said receiver, and electrical means brought into action by the operation of the transmitter for energizing said electrical devices simultaneously.

5. In an electrical selective system, a plurality of transmitters and corresponding receivers, separate sets of electrical devices for operating the receivers, one set for each receiver, a relatively small number of polarized relays having normally open circuits in which said electrical devices are connected, a smaller number of line circuits in which the polarized relays are connected in series, one at least of said relays being operated by a current of negative polarity, circuit closers connected to the line circuits, and separate devices actuated by the transmitters for operating different combinations or sets of circuit closers, one of the circuit closers of each set being connected in the negative side of the main line circuit.

6. In duplicate transmitting and receiving typewriting machines having corresponding keys, a relatively small number of circuit closers for the transmitter keys arranged in sets, a source of electric energy having its positive and negative poles connected respectively to the separate sets of circuit closers, a less number of line circuits connected to said circuit closers, separate selective devices actuated by the separate transmitter keys for operating different combinations of circuit closers including at least one of the negative circuit closers, polarized relays connected in series in the main line circuits, normally open local circuits at the receiving machine controlled by said relays, electrical devices at the receiving machine connected in said open local circuits and arranged to be operated in combinations controlled by the relays corresponding to the selected circuit closers of each transmitter key, and means brought into action by the operation of the several combinations of electrical devices at the receiving machine for operating corresponding receiver keys.

7. In electrically operated duplicate typewriting machines, a sending machine and a receiving machine both having platens movable axially in one direction in the usual manner during the printing operation, the platen of the sending machine being returned by hand in the usual manner, means for returning the platen of the receiving machine comprising a toothed member operatively connected to and actuated by the platen of the sending machine as the latter is returned by hand, a corresponding toothed member operatively connected to the platen of the receiving machine, an actuator for successively engaging the teeth of the last named member to return the platen of the receiving machine step by step, electrically operated means for operating the actuator including circuit closers therein, and means actuated successively by the teeth of the first named member of the sending machine for repeatedly closing the circuit closer.

8. In electrically operated duplicate typewriting machines, a sending machine and a receiving machine, both machines having platens movable axially in one direction in the usual manner, the platen of the sending machine being returned by hand in the usual manner, electrically operated means for returning the platen of the receiving machine step by step and including a circuit closer, and separate means actuated by the return of the platen of the sending machine by hand for repeatedly closing the circuit closer.

9. In electrically operated duplicate typewriting machines, a sending machine and a receiving machine, both machines having platens movable axially in one direction in the usual manner, the platen of the sending machine being returned by hand in the usual manner, electrically operated means for returning the platen of the receiving machine step by step and including a circuit closer, separate means actuated by the return of the platen of the sending machine by hand for repeatedly closing the circuit closer, and coöperative devices on the receiving machine for rotating the platen one line space when the latter is returned to its starting position.

In witness whereof I have hereunto set my hand on this 17th day of December 1909.

BLAINE KELLEY.

Witnesses:
H. E. CHASE,
A. L. HUMPHREY.

---

Copies of this patent may be obtained for five cents each, by addressing the "Commissioner of Patents, Washington, D. C."